UNITED STATES PATENT OFFICE.

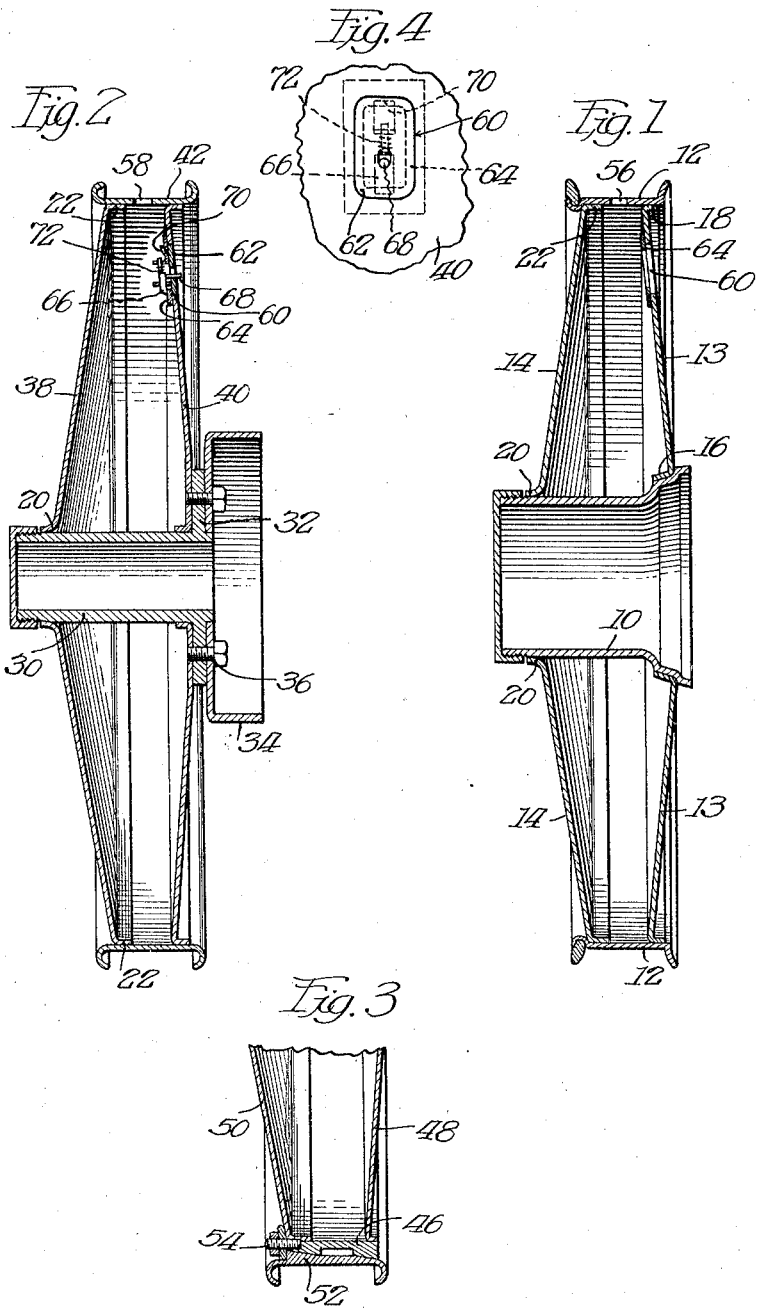

JAMES A. CHARTER, OF CHICAGO, ILLINOIS.

WHEEL.

1,327,310. Specification of Letters Patent. Patented Jan. 6, 1920.

Application filed May 22, 1919. Serial No. 299,022.

*To all whom it may concern:*

Be it known that I, JAMES A. CHARTER, a citizen of the United States, residing at Chicago, in the county of Cook and State of Illinois, have invented a certain new and useful Improvement in Wheels, of which the following is a specification.

This invention relates to wheels particularly metallic spokeless wheels.

The objects of this invention are: to provide mechanism by which the hub and the rim of other well known types of wheels, particularly wire spoked wheels, may be used in a wheel of this spokeless class; to provide a very light, strong and rigid wheel at minimum expense; which is rivetless and boltless and without joints when completed and so water and air tight, therefore internally rustless, and therefore practically indestructible. A further object is to provide a wheel in which the tire valve tube is inclosed and sealed within the body of the wheel proper, this in combination with a self-sealing door device affording access to such wheel when necessary for inflating the tire.

The invention consists of mechanism for carrying out the foregoing objects which can be easily and cheaply made, which is satisfactory in operation, and is not liable to get out of order. More particularly the invention consists of the features and details of construction hereafter more fully set forth in the specification and claims.

Referring to the drawings, in which like numerals represent the same parts throughout the several views, Figure 1 is a vertical sectional view of a wheel structure illustrating this invention in its preferred form, especially adaptable for use in constructing a wheel of this invention.

Fig. 2 is a corresponding sectional view for a modified form of wheel structure, illustrating the method of using this invention in converting an old type wood spoke wheel into a metallic type.

Fig. 3 is a fragmentary sectional view of the rim portion of the wheel, showing the method of applying the device to an old style rim in which a demountable rim is used.

Fig. 4 is a face view of the portion of one of the wheel plates, containing the door mechanism giving access to the tire tube.

Referring to the structure shown in Fig. 1, a suitable hub 10, and a tire carrying rim 12 without novelty, of the form commonly found in ordinary wire spoke wheels are provided. A disk 13 Z-shaped in cross section having a flange 16 inwardly turned at the hub and a flange 18 outwardly turned at the rim and a disk 14 Z-shaped in cross section having an outwardly turned flange 20 at the hub, and an inwardly turned flange 22 at the rim are provided.

The disk 14 is first inserted into the rim and soldered, brazed, welded or otherwise secured all the way around on the surface of contact between the outer side of flange 22, and the inner surface of rim 12 so as to make a water tight joint. The disk 13 is now similarly secured on the circumference of the hub 10. The now partially finished parts comprising respectively: the rim and disk 14, and the hub and disk 13 are now slipped together to the position shown in the drawings and a water tight joint is first made between the flange 20 and the hub 10, after which a similar water tight joint is made between the flange 18 and the rim 12. By carrying out this mode of operation, the adjacent parts of the wheel can be trued up and kept trued at this stage of the operation with the result that a properly finished wheel is obtained with a minimum amount of effort.

In the construction shown in Fig. 2 the hub 30 differs from the hub 10 in that being of the type ordinarily used on wooden spoked wheels it has a flange 32 upon which a brake drum 34 is attached by any suitable means, such as bolts 36. Except for variation in size disk 38 corresponds to disk 14, and disk 40 except for variation in size and shape due to the difference in the form of hub, is the same as disk 13. For purposes of illustration, a different commercial form of rim 42 is shown in Fig. 2, in lieu of rim 12 of Fig. 1. The two rims of Figs. 1 and 2 are interchangeable in the two types of wheel shown in the figures.

In the type of wheel shown in Fig. 3 the only change is in the rim in which fixed rim member 46 is the one secured to the respective disks 48 and 50. This rim 46 is equipped with an ordinary demountable rim 52, without novelty, secured in place in the usual way by screw mechanism 54.

Rim 12 is equipped with a tire valve tube opening 56, and rim 42 has a similar opening 58.

Access to a tire valve tube which may be inserted through either one of the openings 56 or 58, is obtained through a suitable opening 60, shown in open condition in Fig. 1, closable by a flush, outer surfaced, metallic door mechanism, shown in detail in Fig. 2. This door mechanism comprises a door plate proper 62 which enters and fills opening 60 abutting against an inner flange plate 64. This door is provided with latch mechanism 66, clearly shown in Fig. 2 contractible by means of a hand manipulated pin 68, sliding in a slot 70 to compress a spring 72 as is obvious from the drawing. One side of the door is held in place by a hook 70 which grips one side of plate 64.

The entire mechanism in view of the above described construction, is thoroughly moisture proof, as to the interior chamber between the disks, and is made without bolts or rivets and is therefore very economical in construction. The wheel is given rigidity by the fact that the disks are always separated from each other and are most widely separated at the hub.

Having thus described my invention what I claim as new and desire to secure by Letters Patent, is:

1. A metal vehicle wheel comprising a suitable rim, two disks spaced apart from each other at the rim, and more widely separated from each other as they approach the hub, each of said disks being Z-shaped, the corresponding flanges of said disks being turned in the same direction.

2. A metal vehicle wheel comprising a suitable rim, two disks spaced apart from each other at the rim, and more widely separated from each other as they approach the hub, each of said disks being Z-shaped, the corresponding flanges of said disks being turned in the same direction, said flanges at the rim of the wheel turning inward, said flanges at the hub of the wheel turning outward.

3. A metallic wheel comprising a hub and a rim, a Z-shaped disk at the outer face of the wheel welded to the hub and the rim, another disk forming the inner face of the wheel spaced a substantial distance away from the first disk, having an inturned flange at the hub, and an outwardly turned flange at the rim secured by welding to the rim and hub.

In witness whereof I have hereunto subscribed my name in the presence of two witnesses.

JAMES A. CHARTER.

Witnesses:
DWIGHT B. CHEEVER,
ANNA ROSENTHAL.